United States Patent
Blackburn

(10) Patent No.: US 7,126,914 B2
(45) Date of Patent: *Oct. 24, 2006

(54) DIGITAL SUBSCRIBER LINE USER CAPACITY ESTIMATION

(75) Inventor: Stuart Lynch Blackburn, San Ramon, CA (US)

(73) Assignee: SBC Knowledge Ventures, LP, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 10/766,314

(22) Filed: Jan. 28, 2004

(65) Prior Publication Data

US 2005/0163128 A1    Jul. 28, 2005

(51) Int. Cl.
    H04L 12/28    (2006.01)
(52) U.S. Cl. ............ 370/233; 370/234; 370/252; 370/253; 370/395.21
(58) Field of Classification Search ........... 370/252, 370/230, 232, 233, 234, 235, 253, 254, 230.1, 370/395.21, 395.4
See application file for complete search history.

(56) References Cited

U.S. PATENT DOCUMENTS

| | | | |
|---|---|---|---|
| 5,280,483 A * | 1/1994 | Kamoi et al. ............ 370/234 |
| 5,751,338 A | 5/1998 | Ludwig, Jr. |
| 5,764,961 A * | 6/1998 | Bhat ........................ 703/21 |
| 5,974,139 A | 10/1999 | McNamara et al. |
| 5,987,061 A | 11/1999 | Chen |
| 6,044,107 A | 3/2000 | Gatherer et al. |
| 6,055,268 A | 4/2000 | Timm et al. |
| 6,081,291 A | 6/2000 | Ludwig, Jr. |
| 6,292,559 B1 | 9/2001 | Gaikwad et al. |
| 6,317,495 B1 | 11/2001 | Gaikwad et al. |
| 6,424,657 B1 * | 7/2002 | Voit et al. ................ 370/412 |
| 6,466,088 B1 | 10/2002 | Rezvani et al. |
| 6,467,092 B1 | 10/2002 | Geile et al. |
| 6,477,238 B1 | 11/2002 | Schneider et al. |
| 6,498,791 B1 | 12/2002 | Pickett et al. |
| 6,507,606 B1 | 1/2003 | Shenoi et al. |
| 6,532,277 B1 | 3/2003 | Ulanskas et al. |
| 6,538,451 B1 | 3/2003 | Galli et al. |
| 6,549,568 B1 | 4/2003 | Bingel |
| 6,570,855 B1 * | 5/2003 | Kung et al. ............ 370/237 |
| 6,597,689 B1 | 7/2003 | Chiu et al. |

(Continued)

OTHER PUBLICATIONS

International Telecommunication Union, "Series G:Transmission Systems and Media, Digital Systems and Networks. Digital Sections and Digital Line System-Access Networks. Asymetric Digital Subscriber Line (ADSL) Transceivers- 2(ADSL2)," G.992.3, ITU-T. Jul. 2002, pp. 1-127.

*Primary Examiner*—Seema S. Rao
*Assistant Examiner*—Shick Hom
(74) *Attorney, Agent, or Firm*—Toler Schaffer, LLP

(57) ABSTRACT

In a particular embodiment, the present disclosure is directed to a data communications system. The data communication system includes a plurality of digital subscriber lines, a digital subscriber line multiplexer coupled to each of the plurality of digital subscriber lines; and a data switch coupled to the digital subscriber line multiplexer via a communication link. The data communications system is configured such that the number of digital subscriber line users supported by the digital subscriber line multiplexer is determined based on an estimated maximum number of users, the estimated maximum number of users determined based on an average peak bandwidth per user value, a data communication capacity of the communication link, and a data transmission slowdown indicator.

16 Claims, 4 Drawing Sheets

U.S. PATENT DOCUMENTS

| | | |
|---|---|---|
| 6,608,835 B1 | 8/2003 | Geile et al. |
| 6,614,781 B1 | 9/2003 | Elliott et al. |
| 6,625,255 B1 | 9/2003 | Green et al. |
| 6,640,239 B1 | 10/2003 | Gidwani |
| 6,643,266 B1 | 11/2003 | Pugaczewski |
| 6,658,052 B1 | 12/2003 | Krinsky et al. |
| 6,667,971 B1 | 12/2003 | Modarressi et al. |
| 6,668,041 B1 | 12/2003 | Kamali et al. |
| 6,674,725 B1 | 1/2004 | Nabkel et al. |
| 6,674,749 B1 | 1/2004 | Mattathil |
| 6,680,940 B1 | 1/2004 | Lewin et al. |
| 6,697,768 B1 | 2/2004 | Jones et al. |
| 6,700,927 B1 | 3/2004 | Esliger et al. |
| 6,724,859 B1 | 4/2004 | Galli |
| 6,728,238 B1 | 4/2004 | Long et al. |
| 6,731,678 B1 | 5/2004 | White et al. |
| 6,735,601 B1 | 5/2004 | Subrahmanyam |
| 6,751,218 B1 | 6/2004 | Hagirahim et al. |
| 6,751,315 B1 | 6/2004 | Liu et al. |
| 6,751,662 B1 | 6/2004 | Natarajan et al. |
| 6,754,283 B1 | 6/2004 | Li |
| 6,762,992 B1 | 7/2004 | Lemieux |
| 6,763,025 B1 | 7/2004 | Leatherbury et al. |
| 6,765,864 B1 | 7/2004 | Natarajan et al. |
| 6,765,918 B1 | 7/2004 | Dixon et al. |
| 6,769,000 B1 | 7/2004 | Akhtar et al. |
| 6,769,024 B1 | 7/2004 | Natarajan et al. |
| 6,771,673 B1 | 8/2004 | Baum et al. |
| 6,775,232 B1 | 8/2004 | Ah Sue et al. |
| 6,775,267 B1 | 8/2004 | Kung et al. |
| 6,775,268 B1 | 8/2004 | Wang et al. |
| 6,775,273 B1 | 8/2004 | Kung et al. |
| 6,778,525 B1 | 8/2004 | Baum et al. |
| 6,782,082 B1 | 8/2004 | Rahamim |
| 2002/0163883 A1* | 11/2002 | Price .......................... 370/229 |
| 2002/0176367 A1* | 11/2002 | Gross ......................... 370/252 |
| 2004/0095921 A1 | 5/2004 | Kerpez |
| 2004/0236547 A1* | 11/2004 | Rappaport et al. ............. 703/2 |
| 2005/0141429 A1* | 6/2005 | Jayakrishnan et al. ...... 370/236 |
| 2005/0144306 A1* | 6/2005 | Hart et al. .................. 709/232 |

* cited by examiner

DIGITAL SUBSCRIBER LINE USER CAPACITY ESTIMATION

FIELD OF THE DISCLOSURE

The present disclosure generally relates to data communication systems and methods of configuring a data network based on user capacity estimation techniques.

BACKGROUND OF THE DISCLOSURE

Telecommunications providers of data services, such as digital subscriber line (DSL) service, utilize concentration equipment that support many individual lines. To configure such equipment in a manner to match the data needs of the subscribers connected thereto, it would be desirable to have a data transmission capacity model. With conventional methods, there is no good method of estimating the number of customers that can be served by a remote terminal or a digital subscriber line access multiplexer (DSLAM). A limiting factor in capacity is the connection between the remote terminal or the DSLAM and the ATM switch. Typically this connection is an OC3 or DS3 connection. In the event that the equipment is configured above a reasonable capacity, then customers receive a lower quality service and experience significant data slowdown.

Accordingly, there is a need for a method and system to estimate the number of customers that can be supported on deployed network equipment.

DETAILED DESCRIPTION OF THE DRAWINGS

In a particular embodiment, the present disclosure is directed to a data communications system. The data communication system includes a plurality of digital subscriber lines, a digital subscriber line multiplexer coupled to each of the plurality of digital subscriber lines, and a data switch coupled to the digital subscriber line multiplexer via a communication link. The data communications system is configured such that the number of digital subscriber line users supported by the digital subscriber line multiplexer is determined based on an estimated maximum number of users. The estimated maximum number of users is determined based on an average peak bandwidth per user value, a data communication capacity of the communication link, and a data transmission slowdown indicator.

In another embodiment, the disclosure is directed to a method of configuring a data network. The method includes determining an average peak bandwidth per user value for the data network, determining a capacity of a communication link connecting a digital subscriber line access multiplexer (DSLAM) and an asynchronous transfer mode (ATM) switch, determining a data transmission slowdown indicator that includes a slowdown amount and a probability of experiencing a slowdown event, determining an estimated maximum number of users of digital subscriber lines that may be supported by the DSLAM, and configuring the data network such that the DSLAM has a configured number of users of digital subscriber lines that is less than or equal to the estimated maximum number of users of digital subscriber lines. The estimated maximum number of users of digital subscriber lines is based on the average peak bandwidth per user value, the capacity of the communication link, and the customer data transmission slowdown indicator.

In another particular illustrative embodiment, the present disclosure is generally directed to a method of estimating a maximum number of users of broadband equipment based on a desired level of service and performance. A method of configuring a data network is also disclosed. The method includes determining an average peak bandwidth per user value for the data network, determining a capacity of a communication link connecting a remote terminal (RT) to an asynchronous transfer mode (ATM) switch via an optical concentrator device, determining a data transmission slowdown indicator that includes a slowdown amount and a probability of experiencing a slowdown event, and determining an estimated maximum number of users that may be supported by the RT. The estimated maximum number of users is based on the average peak bandwidth per user value, the capacity of the communication link, and the customer data transmission slowdown indicator. The method further includes configuring the data network such that the RT has a configured number of users that is less than or equal to the estimated maximum number of users that may be supported by the RT.

Figure 1:
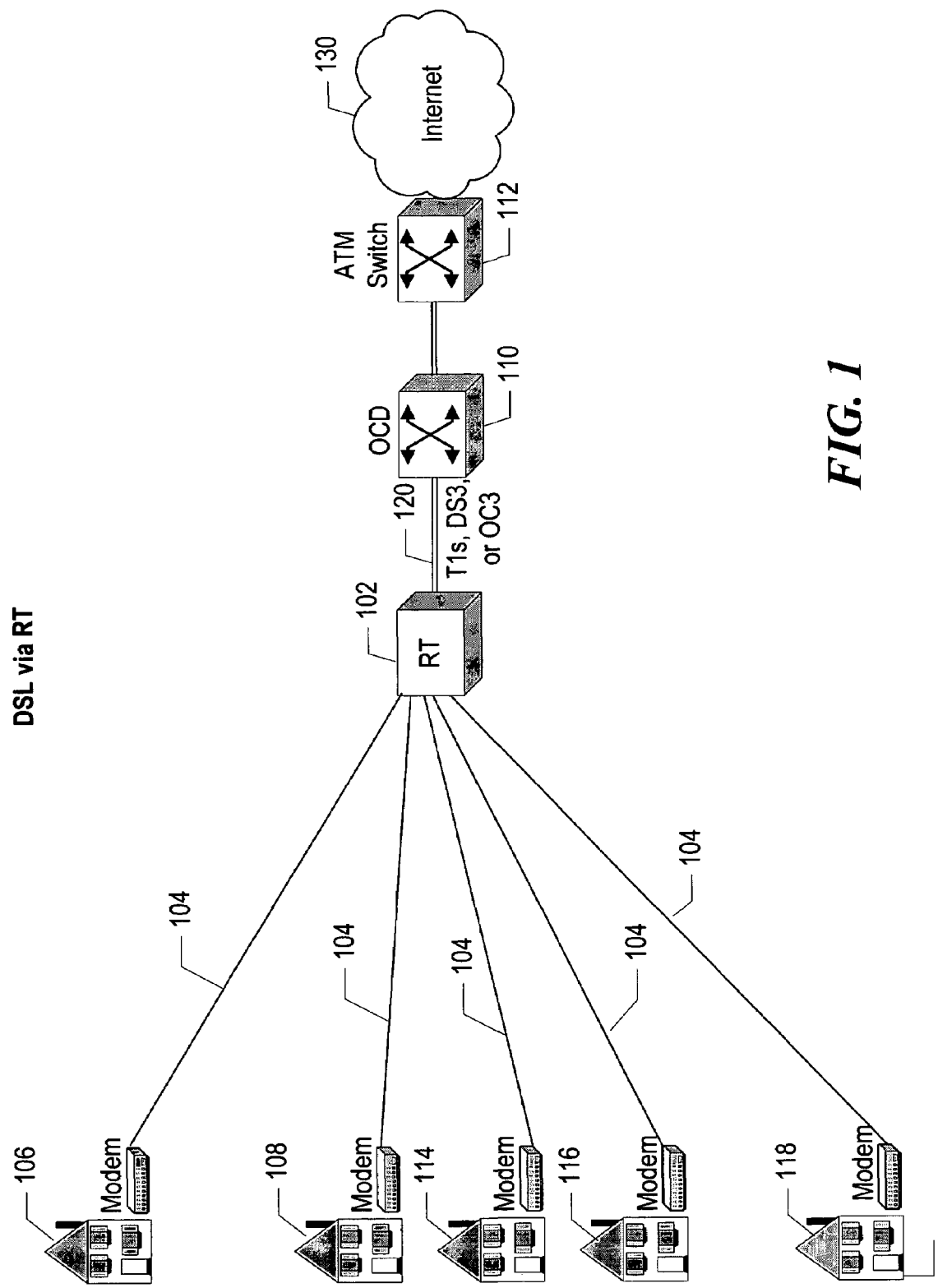
FIG. 1 is a general block diagram that illustrates a network with a remote terminal (RT) supporting residential subscribers.

Referring to FIG. 1, an illustrative communication system that includes DSL lines and backend data switches is shown. The system includes a remote terminal (RT) 102 connected remotely from an optical concentrator device (OCD) 110 via communication lines 120. The communication lines 120 may be T1 lines, DS3 lines, or OC3 lines as shown. The OCD 110 is coupled to an ATM switch 112, which in turn is connected to the internet 130. The remote terminal 102 supports a plurality of digital subscriber lines (DSL) 104 which are coupled to customer premise equipment at subscriber locations. Sample subscribers are illustrated as units 106, 108, 114, 116, and 118. An example of customer premises equipment includes a DSL modem as shown. Data received by the remote terminal 102 from the plurality of DSL lines 104 is concentrated and carried over the communication line 120 to the concentration device 110. Data is extracted from the concentration device and communicated in an asynchronous transfer mode (ATM) format to the ATM switch 112. Data in packet form is then carried over the internet 130. With the system shown with respect to FIG. 1, the number of DSL lines 104 that may be supported by a given remote terminal 102 needs to be determined prior to configuration to avoid overloading of the system. Thus, it would be desirable prior to configuration to determine the appropriate number of DSL lines that may be supported by the RT 102.

Figure 2:
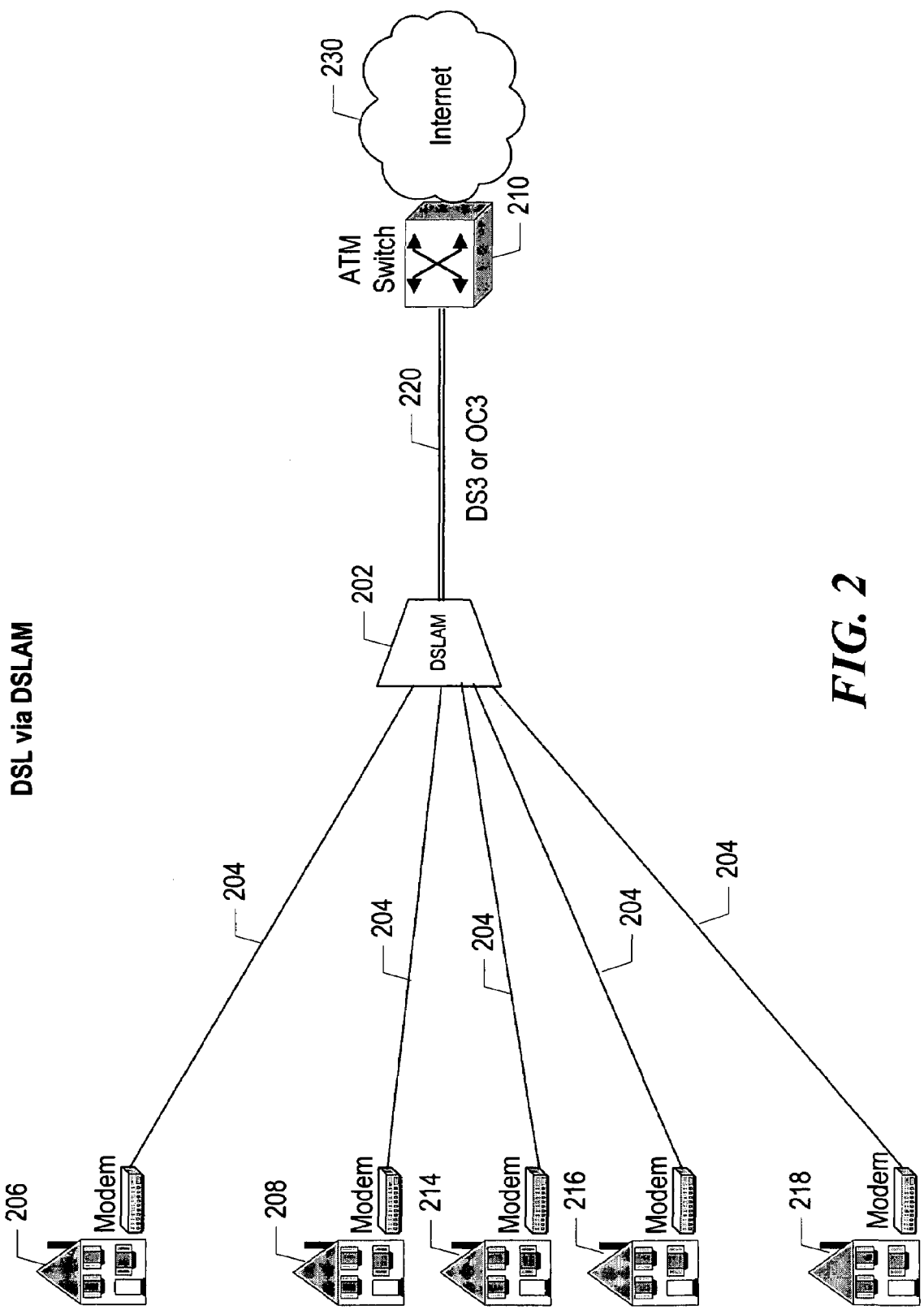
FIG. 2 is a general block diagram that illustrates a network with a DSLAM supporting residential subscribers.

Referring to FIG. 2, another example communication system that supports DSL lines and backend data traffic is shown. The system includes a plurality of DSL lines 204 supported by a digital subscriber line access multiplexer 202 (DSLAM). The DSLAM 202 is connected to ATM switch 210 via the communication link 220. An example of the communication link 220 is a DS3 or OC3 line. The ATM switch 210 is connected to the internet 230. The DSL lines 204 are connected to customer premise equipment at various subscriber locations as shown at 206, 208, 214, 216, 218. Prior to configuration of the DSL lines 204, it would be useful to determine an appropriate number of DSL lines that may be supported by the specific DSLAM 202. Information regarding the appropriate number of DSL lines may be used for system configuration.

Figure 3:
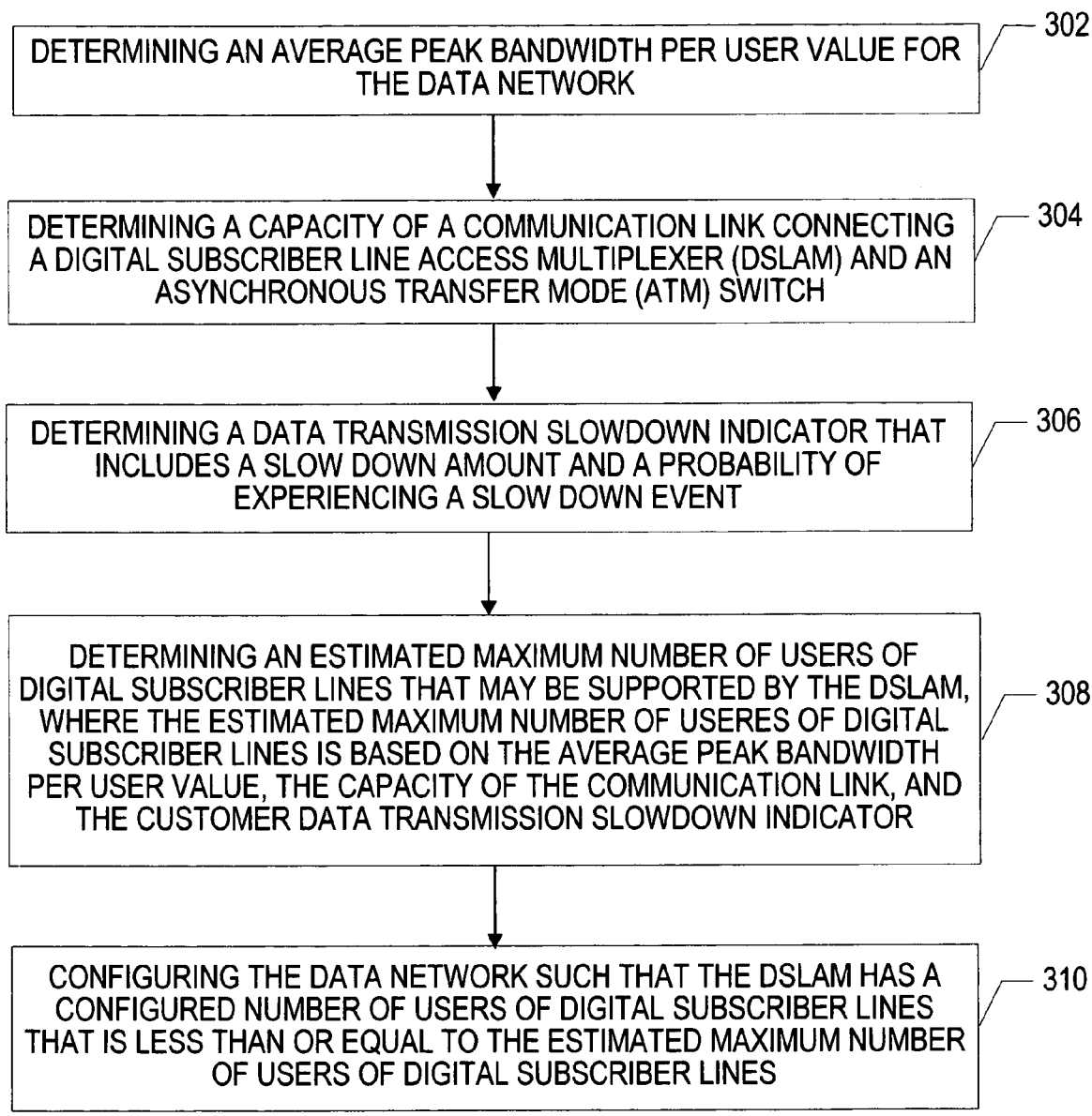
FIG. 3 is a flow chart that illustrates a method of estimating a maximum number of users of DSL lines supported by a DSLAM.

Referring to FIG. 3, a method of configuring a data network is illustrated. An average peak bandwidth is determined on a per user basis for the data network, as shown at 302. A capacity of a communication link is determined, at 304. The capacity of the communication link is for a DSLAM and a corresponding asynchronous mode (ATM) switch. A data transmission slowdown indicator is determined that includes a slowdown amount and a probability of experiencing a slowdown event, as shown at 306.

Based on the prior information, an estimated maximum number of users is determined corresponding with a maximum number of DSL lines that may be supported by the DSLAM, is shown at 308. The estimated maximum number of users of DSL lines is based on the average peak bandwidth per user value, the capacity of the communication link, and the customer data transmission slowdown indicator. Once an estimated maximum number of users of DSL lines is determined, the data network may be configured such that the DSLAM has a configured number of users of DSL lines that is less than or equal to the estimated maximum number of users of DSL lines. This process step is shown at 310. Thus, after determining the estimated maximum number of DSL lines, DSLAM equipment may be configured to prevent overuse and traffic congestion of the DSL network. In addition, the DSLAM may be properly loaded to provide for increased traffic utilization, but not exceeding the estimated maximum number of lines.

Figure 4:
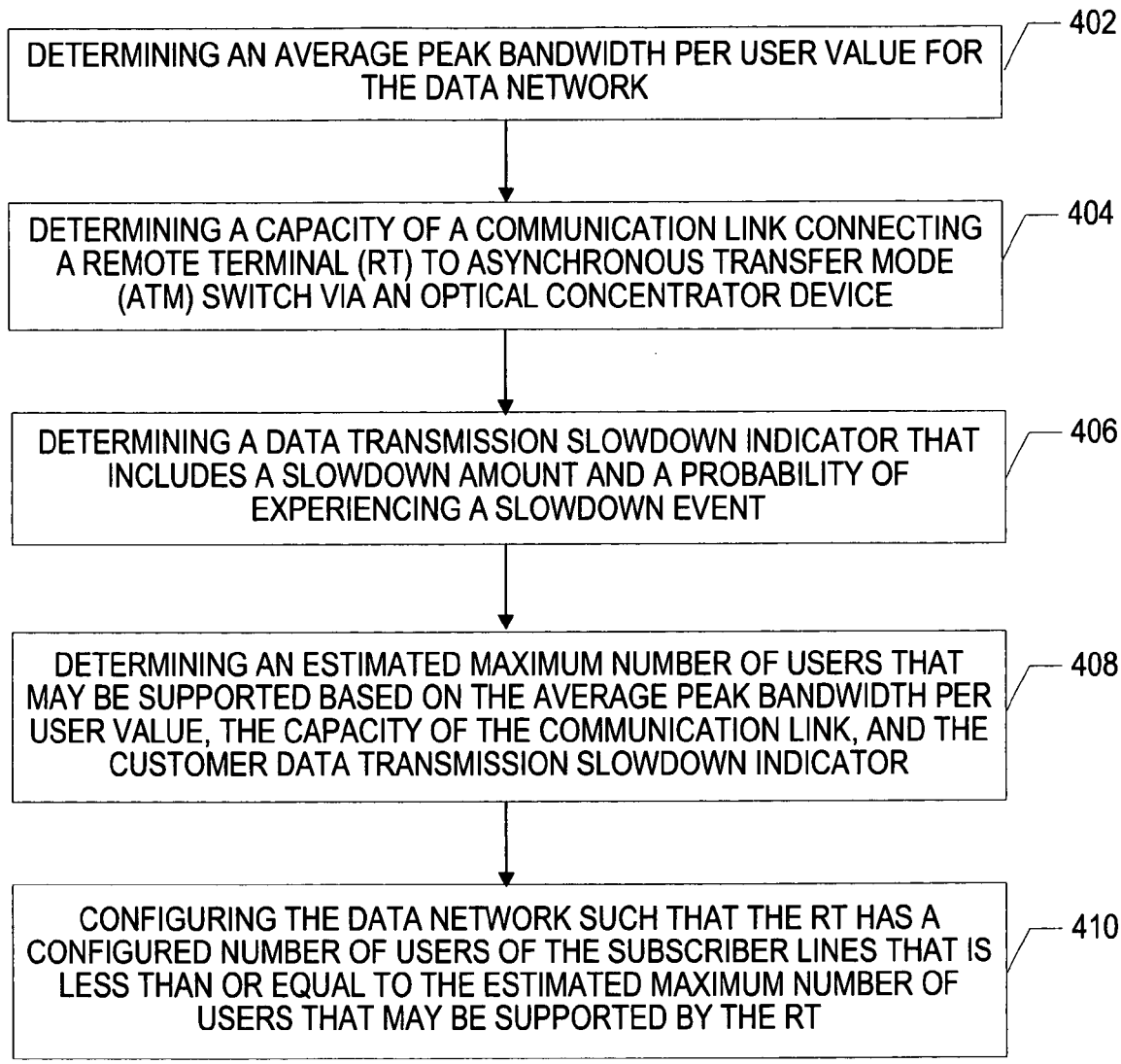
FIG. 4 is a flow chart that illustrates a method of estimating a maximum number of users of DSL lines supported by an RT unit.

Referring to FIG. 4, another method of configuring a data network is illustrated. An average peak bandwidth per user value is determined for the data network, at 402. A capacity of a communication link that connects a remote terminal (RT) to the ATM switch via an optical concentrator device is determined, at 404. A data transmission slowdown indicator is determined, at 406. The data transmission slowdown indicator includes a slowdown amount and a probability of experiencing a slowdown event that would cause a slowdown. Based on the average peak bandwidth per user value, the capacity of the communication link, and the customer data transmission slowdown indicator, an estimated maximum number of users that may be supported by the remote terminal (RT) is determined, at 408. Once the estimated maximum number of users that may be supported by the RT is determined, the data network is configured such that the RT has a configured number of users that is less than or equal to the estimated maximum number of users. The data configuration step is shown at 410.

An example of an estimated maximum capacity model that may be used to calculate the estimated maximum capacity is now shown. For purposes of illustration, the bandwidth capacity of a remote terminal will be illustrated as the bandwidth B. The capacity of an individual user, which is the highest data transmission speed available to that user, will be labeled C. Typically, this individual user download speed for a DSL line is about 1.5 megabits per second. The average peak period bandwidth per customer will be indicated as A. This value is averaged over all customers in the network even those that are not currently logged in.

The number of servers will be determined as B/C. The total number of customers on an RT will be labeled PS for population size. The probability of a random user downloading at any given instant will be labeled U and is defined as A/C. A probability distribution labeled P is calculated as U/(1−U). This is substantially the same calculation utilized for telephone circuits based on an Erlang engineering distribution. P(n) is the probability of n customers actively downloading in a randomly chosen time.

With these variable definitions, the model formula is defined below:

$$F(0) = 1.$$
$$F(n) = \rho * F(n-1) * (P-(n-1))/n \quad \text{for } n<S.$$
$$F(n) = \rho * F(n-1) * (P-(n-1))/S \quad \text{for } S<=n<=PS$$
$$0 \quad \text{for } n>PS$$
$$p(0) = 1 / \sum_{n=0}^{PS} F(n).$$
$$p(n) = F(n) * p(0).$$

A specific example with specific data filled in for a given remote terminal is now presented:

A rural RT is served by 2 T1 lines and has 20 customers all with a maximum download speed of 1.5 Mb/s and an average peak bandwidth of 50 kb/sec.

| | |
|---|---|
| B | 3072 |
| C | 1536 |
| A | 50 |
| S | 2 |
| PS | 20 |
| U | 0.0326 |
| D | 0.0336 |

| | | | |
|---|---|---|---|
| F(0) = | 1 | p(0) = | 50.54% |
| F(1) = | 0.672948 | p(1) = | 34.01% |
| F(2) = | 0.215108 | p(2) = | 10.87% |
| F(3) = | 0.065140 | p(3) = | 3.29% |
| F(4) = | 0.018630 | p(4) = | 0.94% |
| F(5) = | 0.005015 | p(5) = | 0.25% |
| F(6) = | 0.001266 | p(6) = | 0.06% |
| F(7) = | 0.000298 | p(7) = | 0.02% |
| F(8) = | 0.000065 | p(8) = | 0.00% |
| F(9) = | 0.000013 | p(9) = | 0.00% |
| F(10) = | 0.000002 | p(10) = | 0.00% |
| F(11) = | 0.000000 | p(11) = | 0.00% |
| F(12) = | 0.000000 | p(12) = | 0.00% |
| F(13) = | 0.000000 | p(13) = | 0.00% |
| F(14) = | 0.000000 | p(14) = | 0.00% |
| F(15) = | 0.000000 | p(15) = | 0.00% |
| F(16) = | 0.000000 | p(16) = | 0.00% |
| F(17) = | 0.000000 | p(17) = | 0.00% |
| F(18) = | 0.000000 | p(18) = | 0.00% |
| F(19) = | 0.000000 | p(19) = | 0.00% |
| F(20) = | 0.000000 | p(20) = | 0.00% |
| Sum | 1.978486 | Sum | 100.00% |

One way to engineer the RT is to ensure that customers experience a slowdown of no more than, say, 20%, no more than X% of the time. The tables below show the results for this example with X=1%, 5%, and 10%.

Probability of Slowdown in the Peak Period less than 1%.

| | Ave Peak Period BW/Cust. in Kb/sec | | | |
|---|---|---|---|---|
| # of T1s | 30 | 40 | 60 | 100 |
| 1 | 5 | 4 | 3 | 2 |
| 2 | 19 | 15 | 10 | 6 |

-continued

Probability of Slowdown in the Peak Period less than 1%.

| | Ave Peak Period BW/Cust. in Kb/sec | | | |
|---|---|---|---|---|
| # of T1s | 30 | 40 | 60 | 100 |
| 3 | 39 | 29 | 20 | 12 |
| 4 | 62 | 47 | 31 | 19 |
| 5 | 87 | 66 | 44 | 27 |
| 6 | 135 | 102 | 69 | 42 |
| 7 | 166 | 125 | 84 | 51 |
| 8 | 197 | 149 | 100 | 61 |

Probability of Slowdown in the Peak Period less than 5%.

| | Ave Peak Period BW/Cust. in Kb/sec | | | |
|---|---|---|---|---|
| # of T1s | 30 | 40 | 60 | 100 |
| 1 | 12 | 9 | 6 | 4 |
| 2 | 33 | 25 | 17 | 10 |
| 3 | 60 | 45 | 30 | 19 |
| 4 | 90 | 58 | 45 | 28 |
| 5 | 122 | 92 | 62 | 37 |
| 6 | 176 | 132 | 89 | 54 |
| 7 | 211 | 159 | 107 | 65 |
| 8 | 248 | 187 | 125 | 76 |

Probability of Slowdown in the Peak Period less than 10%.

| | Ave Peak Period BW/Cust. in Kb/sec | | | |
|---|---|---|---|---|
| # of T1s | 30 | 40 | 60 | 100 |
| 1 | 17 | 12 | 8 | 5 |
| 2 | 43 | 32 | 22 | 13 |
| 3 | 74 | 56 | 37 | 23 |
| 4 | 107 | 81 | 54 | 33 |
| 5 | 143 | 107 | 72 | 44 |
| 6 | 198 | 149 | 100 | 61 |
| 7 | 237 | 178 | 120 | 73 |
| 8 | 276 | 208 | 139 | 85 |

The above disclosed method and model provides an improved estimate for the number of customers that may be served by a given sized communication link. This estimate is useful for configuration of data networks as illustrated. The method may be implemented by use of a spreadsheet program on a personal computer. In addition, the model has wide applicability and may be useful for telecommunications providers to determine the amount of bandwidth needed to provide a given service. Similarly, suppliers of switching equipment may use the model to assist their customers to properly size their deployed networks.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of configuring a data network, the method comprising:
    determining an average peak bandwidth per user value for the data network;
    determining a capacity of a communication link connecting a digital subscriber line access multiplexer (DSLAM) and an asynchronous transfer mode (ATM) switch;
    determining a data transmission slowdown indicator that includes a slowdown amount and a probability of experiencing a slowdown event;
    determining an estimated maximum number of users of digital subscriber lines that may be supported by the DSLAM, where the estimated maximum number of users of digital subscriber lines is based on the average peak bandwidth per user value, the capacity of the communication link, and the customer data transmission slowdown indicator; and
    configuring the data network such that the DSLAM has a configured number of users of digital subscriber lines that is less than or equal to the estimated maximum number of users of digital subscriber lines.

2. The method of claim 1, wherein the estimated maximum number of users of digital subscriber lines is further based on a probability of a random user downloading data at a given period of time.

3. The method of claim 1, wherein the estimated maximum number of users of digital subscriber lines is further based on an Erlang model calculation.

4. The method of claim 1, wherein the communication link is one or more Digital Signal-level 3 (DS3) type communication links or an Optical Carrier-level 3 (OC3) type communication link.

5. The method of claim 1, wherein the estimated maximum number of users of digital subscriber lines is calculated with an assumption of a data transfer speed associated wit a plurality of users.

6. The method of claim 5, wherein the data transfer speed is about 1.5 Mbits/second.

7. A method of configuring a data network, the method comprising:
    determining an average peak bandwidth per user value for the data network;
    determining a capacity of a communication link connecting a remote terminal (RT) to asynchronous transfer mode (ATM) switch via an optical concentrator device;
    determining a data transmission slowdown indicator that includes a slowdown amount and a probability of experiencing a slowdown event;
    determining an estimated maximum number of users that may be supported by the RT, where the estimated maximum number of users is based on the average peak bandwidth per user value, the capacity of the communication link, and the data transmission slowdown indicator; and
    configuring the data network such that the RT has a configured number of users of subscriber lines that is less than or equal to the estimated maximum number of users that may be supported by the RT.

8. The method of claim 7, wherein the communication link comprises a plurality of T1 transmission lines.

9. The method of claim 7, wherein the communication link comprises one of an Optical Carrier-level 3 (OC3) and one or more Digital Signal-level 3 (DS3) links.

10. A data communications system comprising:
a plurality of digital subscriber lines;
a digital subscriber line multiplexer coupled to each of the plurality of digital subscriber lines; and
a data switch coupled to the digital subscriber line multiplexer via a communication link;
wherein the data communications system is configured such that the number of digital subscriber line users supported by the digital subscriber line multiplexer is determined based on an estimated maximum number of users, the estimated maximum number of users determined based on an average peak bandwidth per user value, a data communication capacity of the communication link, and a data transmission slowdown indicator, the data transmission slowdown indicator comprising a slowdown amount and a probability of experiencing a slowdown event.

11. A data communications system comprising:
a plurality of digital subscriber lines;
a remote terminal device coupled to each of the plurality of digital subscriber lines; and
a data switch coupled to the remote terminal device via a communication link;
wherein the data communications system is configured such that the number of digital subscriber line users supported by the remote terminal device is determined based on an estimated maximum number of users, the estimated maximum number of users determined based on an average peak bandwidth per user value, a data communication capacity of the communication link, and a data transmission slowdown indicator, the data transmission slowdown indicator comprising a slowdown amount and a probability of experiencing a slowdown event.

12. The system of claim 11, wherein the estimated maximum number of users of digital subscriber lines is further based on a probability of a random user downloading data at a given period of time.

13. The system of claim 11, wherein the estimated maximum number of users of digital subscriber lines is further based on an Erlang model calculation.

14. The system of claim 11, wherein the communication link is one or more Digital Signal-level 3 (DS3) type communication links, an Optical Communication Level 3 (OC3) type communication link, or one or more T1 type communication links.

15. The system of claim 11, wherein the estimated maximum number of users of digital subscriber lines is calculated with an assumption of a data transfer speed associated with a plurality of users.

16. The system of claim 15, wherein the data transfer speed is about 1.5 Mbits/second.

* * * * *